US012633222B2

(12) United States Patent
Lo et al.

(10) Patent No.: US 12,633,222 B2
(45) Date of Patent: May 19, 2026

(54) SYSTEMS AND METHODS FOR DRONE MONITORING, DATA ANALYTICS, AND MITIGATION CLOUD SERVICES USING EDGE COMPUTING

(71) Applicant: SkySafe, Inc., San Diego, CA (US)

(72) Inventors: Brandon Fang-Hsuan Lo, San Diego, CA (US); Scott Torborg, San Diego, CA (US); Mike Spindel, San Diego, CA (US); Paul Wicks, San Diego, CA (US); Stephen Larew, San Diego, CA (US)

(73) Assignee: SkySafe, Inc., San Diego, CA (US)

( * ) Notice: Subject to any disclaimer, the term of this patent is extended or adjusted under 35 U.S.C. 154(b) by 135 days.

(21) Appl. No.: 18/421,758

(22) Filed: Jan. 24, 2024

(65) Prior Publication Data

US 2024/0257648 A1 Aug. 1, 2024

Related U.S. Application Data

(60) Provisional application No. 63/481,693, filed on Jan. 26, 2023.

(51) Int. Cl.
*G08G 5/20* (2025.01)
*G08G 5/55* (2025.01)
*G08G 5/57* (2025.01)

(52) U.S. Cl.
CPC ................ *G08G 5/20* (2025.01); *G08G 5/55* (2025.01); *G08G 5/57* (2025.01)

(58) Field of Classification Search
CPC ............... G08G 5/20; G08G 5/55; G08G 5/57
See application file for complete search history.

(56) References Cited

U.S. PATENT DOCUMENTS 5,345,539 A 9/1994 Webb
8,837,337 B2 9/2014 Blanz et al.
(Continued)

FOREIGN PATENT DOCUMENTS

CN 107272743 A 10/2017
CN 109067478 A 12/2018
(Continued)

OTHER PUBLICATIONS

International Search Report and Written Opinion in International Application No. PCT/US2024/012800, mailed on May 28, 2024, in 16 pages.
(Continued)

*Primary Examiner* — Steven Lim
*Assistant Examiner* — James E Munion
(74) *Attorney, Agent, or Firm* — KNOBBE, MARTENS, OLSON & BEAR, LLP

(57) ABSTRACT

Systems and methods for providing drone activity cloud services to cloud consumers using cloud and edge computing are provided. The drone monitoring service is rendered by drone sensors detecting and identifying drones, cloud and edge servers aggregating drone activity data from sensors and UAS traffic management systems, and cloud consumers monitoring drone activities using cloud and edge devices to access the cloud. The drone data analytics service reports drone activity statistics, predicted drone activities, and abnormal behaviors to cloud consumers based on the statistics and behavior models obtained by machine learning and federated learning techniques. The drone mitigation service, when initiated by cloud consumers, determines how to optimally configure sensors and collaboratively send signals to deactivate unauthorized drones. Moreover, data processing, artificial intelligence, mobility support, and traf-
(Continued)

fic management functional units empower cloud and edge servers to support these cloud services.

20 Claims, 4 Drawing Sheets

(56) References Cited

U.S. PATENT DOCUMENTS

| | | | | |
|---|---|---|---|---|
| 9,275,645 | B2 | 3/2016 | Hearing et al. | |
| 9,529,360 | B1 | 12/2016 | Melamed et al. | |
| 9,763,177 | B1 | 9/2017 | Baskaran et al. | |
| 9,996,079 | B2 | 6/2018 | Magy et al. | |
| 10,051,475 | B2 | 8/2018 | Shattil et al. | |
| 10,139,838 | B2 | 11/2018 | Lection et al. | |
| 10,237,743 | B2 | 3/2019 | Shattil et al. | |
| 10,317,506 | B2 | 6/2019 | Seeber et al. | |
| 10,467,885 | B2 | 11/2019 | Trundle et al. | |
| 2006/0071671 | A1 | 4/2006 | Tola | |
| 2014/0349666 | A1 | 11/2014 | Sun | |
| 2017/0092138 | A1* | 3/2017 | Trundle | H04K 3/82 |
| 2017/0148332 | A1 | 5/2017 | Ziemba et al. | |
| 2017/0295551 | A1 | 10/2017 | Sadiq | |
| 2018/0017665 | A1 | 1/2018 | Wittenberg | |
| 2018/0081355 | A1 | 3/2018 | Magy et al. | |
| 2018/0262900 | A1 | 9/2018 | Moon | |
| 2019/0103030 | A1 | 4/2019 | Banga et al. | |
| 2020/0382156 | A1 | 12/2020 | Lo et al. | |
| 2021/0008833 | A1 | 1/2021 | Tsuchibuchi et al. | |
| 2021/0088337 | A1 | 3/2021 | Koubaa | |
| 2021/0099870 | A1* | 4/2021 | Moon | H04W 12/06 |
| 2021/0116912 | A1 | 4/2021 | Pikus et al. | |
| 2021/0117578 | A1* | 4/2021 | Cheruvu | G06F 21/85 |
| 2021/0407305 | A1 | 12/2021 | Jordan et al. | |
| 2023/0008429 | A1* | 1/2023 | Natiuk | G05D 1/104 |

FOREIGN PATENT DOCUMENTS

| | | | | |
|---|---|---|---|---|
| DE | 102009055263 A1 | 6/2011 | | |
| EP | 3422038 A1 | 1/2019 | | |
| GB | 2546438 A | 7/2017 | | |
| JP | 2004/527166 A | 9/2004 | | |
| KR | 2018/0054007 A | 5/2018 | | |
| WO | WO 2018/125686 A2 | 7/2018 | | |
| WO | WO 2018/170736 A1 | 9/2018 | | |
| WO | WO 2019/032162 A2 | 2/2019 | | |
| WO | WO-2021230948 A2 * | 11/2021 | | G08G 5/26 |

OTHER PUBLICATIONS

International Preliminary Report on Patentability in International Application No. PCT/US2024/012800, mailed on Mar. 20, 2025, in 19 pages.

"Drone Market Is Estimated to Expand at a Healthy CAGR in the Upcoming Forecast 2025," [Online] Sep. 13, 2019 https://www.americanewshour.com/?s=Drone+Market+Is+Estimated+To+Expand+At+a+Healthy+CAGR+in+the+Upcoming+Forecast+2025.

"Evolved Universal Terrestrial Radio Access (E-UTRA); Physical Channels and Modulation," 3GPP TS 36.211 (2018) vol. 15.0.

"FCC Part 15.247 Test Report for GL300A (FCC ID:SS3-GL3001501)," Tech. Rep., Apr. 2015. [Online]. Available: https://fccid.io/SS3-GL3001501/Test-Report/Test-Report-Rev-2599009.

"FCC Part 15.247 Test Report for GL300C (FCC ID: SS3-GL3001510)," Tech. Rep., Oct. 2015. [Online]. Available: https://fccid.io/SS3-GL3001510/RF-Exposure-Info/SAR-Test-Report-2805129.

"FCC Part 15.247 Test Report for GL300F (FCC ID:SS3-GL300F1609)," Tech. Rep., Sep. 2016. [Online]. Available: https://fccid.io/SS3-GL300F1609/Test-Report/Test-Report-3155813.

Beyme et al. "Efficient Computation of DFT of Zadoff-Chu sequences," Elec. Letters (2009) vol. 45, No. 9, pp. 461-463.

D. Angelosante, G. B. Giannakis, and N. D. Sidiropoulos, "Estimating multiple frequency-hopping signal parameters via sparse linear regression," IEEE Transactions on Signal Processing, vol. 58, No. 10, pp. 5044-5056, Oct. 2010.

Federal Aviation Administration, "FAA aerospace forecasts fiscal years 2019-2039," 2019. [Online]. Available: https://www.faa.gov/data research/aviation/aerospace forecasts/.

Gul et al. "Timing and Frequency Synchronization for OFDM Downlink Transmissions Using Zadoff-Chu Sequences," IEEE Trans. On Wireless Comm. (2015) vol. 14, No. 3, pp. 1716-1729.

Haiquan et al., "Proactive eavesdropping in UAV-aided mobile relay systems", EURASIP Journal on Wireless Communications and Networking, Springer International Publishing, Cham, vol. 2020, No. 1, Feb. 24, 2020 (Feb. 24, 2020).

International Preliminary Report on Patentability issued in application No. PCT/US2020/032391, dated Jul. 19, 2021.

International Preliminary Report on Patentability issued in application No. PCT/US2020/034969, dated Sep. 12, 2021.

International Search Report and Written Opinion issued in application No. PCT/US2021/031801, mailed Aug. 17, 2021.

International Search Report mailed Jul. 14, 2020, issued in corresponding International Application No. PCT/US2020/032391, filed May 11, 2020.

International Search Report mailed Sep. 8, 2020, issued in corresponding International Application No. PCT/US2020/034969, filed May 28, 2020.

Khan et al., "Edge computing, A survey," Future Generation Computer Systems, vol. 97, pp. 219-235, Aug. 2019.

Kim et al. "A delay-robust random access preamble detection algorithm for LTE system," Proc. RWS (2012) pp. 7578.

L. Zhao, L. Wang, G. Bi, L. Zhang, and H. Zhang, "Robust frequency-hopping spectrum estimation based on sparse bayesian method," IEEE Transactions on Wireless Communications, vol. 14, No. 2, pp. 781-793, Feb. 2015.

Liang et al. "The Research on Random Access Signal Detection Algorithm in LTE Systems," 2013 5$^{th}$ IEEE Intl. Symp. On Microwave, Ant. Prop. And EMC Tech. for Wireless Comm. (2013) pp. 115118.

Lo, Brandon F., et al., "HopSAC: Frequency Hopping Parameter estimation Based on Random Sample Consensus for Counter-Unmanned Aircraft Systems", MILCOM 2019—2019 IEEE Military Communications Conference (MILCOM), IEEE Nov. 12, 2019, pp. 355-360.

M. A. Fischler and R. C. Bolles, "Random sample consensus: A paradigm for model fitting with applications to image analysis and automated cartography," Communications of the ACM, vol. 24, No. 6, pp. 381-395, Jun. 1981.

M. Satyanarayanan, "The emergence of edge computing," Computer, vol. 50, No. 1, pp. 30-39, Jan. 2017.

Nelson et al. "The View From Above: A Survey of the Public's Perception of Unmanned Aerial Vehicles and Privacy," J. of Urban Tech. (2019) vol. 26, issue 1, pp. 83-105.

Q. Xia et al. "A survey of federated learning for edge computing: research problems and solutions," High-Confidence Computing, vol. 1, No. 1, Jun. 2021.

Simon et al., "On the Implementation and Performance of Single and Double Differential Detection Schemes", IEEE Transactions on Communications, IEEE Service Center, Piscataway, NJ. USA, vol. 40, No. 2, Feb. 1, 1992 (Feb. 1, 1992), pp. 278-291.

Tao et al. "Improved Zadoff-Chu Sequence Detection in the Presence of Unknown Multipath and Carrier Frequency Offset," IEEE Comm. Letters (2019) vol. 22, No. 5, pp. 922-925.

X. Liu, N. D. Sidiropoulos, and A. Swami, "Joint hop timing and frequency estimation for collision resolution in FH networks," IEEE Transactions on Wireless Communications, vol. 4, No. 6, pp. 3063-3074, Nov. 2005.

Y. Wang, C. Zhang, and F. Jing, "Frequency-hopping signal parameters estimation based on orthogonal matching pursuit and sparse linear regression," IEEE Access, vol. 6, pp. 54 310-54 319, Sep. 2018.

(56) References Cited

OTHER PUBLICATIONS

Yu et al. "Random access algorithm of LTE TDD system based on frequency domain detection," Proc. Int. Conf. Semantics, Know1. Grid (2009) pp. 346350.

* cited by examiner

SYSTEMS AND METHODS FOR DRONE MONITORING, DATA ANALYTICS, AND MITIGATION CLOUD SERVICES USING EDGE COMPUTING

CROSS-REFERENCE TO RELATED APPLICATION

This application claims the benefit of U.S. Provisional Application No. 63/481,693, filed Jan. 26, 2023, which is hereby incorporated by reference in its entirety.

BACKGROUND

Uncrewed aircraft systems (UAS) or drones are widely used in a huge variety of applications. As a result, drone activities have gradually become common scenes in everyday life. However, unauthorized drone activities such as those around airports, stadiums, borders, and prisons can have negative economic impacts and raise public safety and security concerns. Thus, drone activity monitoring and mitigation are of great importance to law enforcement and airport security, among others.

SUMMARY OF CERTAIN INVENTIVE ASPECTS

Aspects of this disclosure relate to systems and methods for providing drone activity cloud services to cloud consumers using cloud and edge computing. The drone monitoring service is rendered by drone sensors detecting and identifying drones, cloud and edge servers aggregating drone activity data from sensors and UAS traffic management systems, and cloud consumers monitoring drone activities using cloud and edge devices to access the cloud. The drone data analytics service reports drone activity statistics, predicted drone activities, and abnormal behaviors to cloud consumers based on the statistics and behavior models obtained by machine learning and federated learning techniques. The drone mitigation service, when initiated by cloud consumers, determines how to optimally configure sensors and collaboratively send signals to deactivate unauthorized drones. Moreover, data processing, artificial intelligence, mobility support, and traffic management functional units empower cloud and edge servers to support these cloud services.

An aspect is directed to a system for providing drone activity cloud services to cloud consumer devices. The system comprises a drone sensor configured to detect and identify a drone; a cloud server and an edge server configured to aggregate drone activity data from the drone sensor and an uncrewed aircraft systems (UAS) traffic management system; and a cloud consumer device configured to monitor drone activities using the cloud server and an edge device to access the drone activity data from the cloud server and the edge server, wherein the cloud server and the edge server are further configured to implement a drone data analytics service that reports one or more of drone activity statistics, predicted drone activities, and abnormal behaviors to the cloud consumer device based on statistics and behavior models obtained by machine learning and federated learning techniques, wherein a drone mitigation service, when initiated by the cloud consumer device, is configured to determine how to configure the drone sensor and collaboratively send signals to deactivate an unauthorized drone.

In some embodiments, the system further comprises: a cloud network comprising the cloud server and the cloud consumer device; and an edge network comprising the edge server and the edge device.

In some embodiments, the cloud consumer device comprises one or more of the following: a smartphone, a tablet, a virtual reality device, an augmented reality device, a mixed reality device, a laptop, a desktop computer, a sensor node, and/or a drone.

In some embodiments, the cloud server and the edge server each comprise: a data processing unit configured to filter, fuse, and/or aggregate the drone activity data for a drone monitoring service; and an artificial intelligence unit configured to implement the machine learning and/or the federated learning techniques for the drone data analytics service.

In some embodiments, the cloud server and the edge server each comprises: a sensor control unit configured to determine parameters for smart sensor configurations and/or intelligent jamming; a mobility support unit configured to handle a drone activity handoff at a boundary of a cloud or edge network when the drone moves from one network to another; and a traffic management unit configured to handle cooperative interactions with the UAS traffic management system.

In some embodiments, the drone data analytics service is further configured to generate an activity notification and a trajectory for the identified drone.

In some embodiments, the trajectory and the activity data are overlaid on a map with real-time updates.

An aspect is directed to a method for providing drone activity cloud services to cloud consumer devices. The method comprises detecting and identifying one or more drones using a drone sensor; aggregating, at a cloud server and an edge server, drone activity data from the drone sensor and an uncrewed aircraft systems (UAS) traffic management system; monitoring, at the cloud consumer device, drone activities using the cloud consumer device and the edge device to access the drone activity data from the cloud server and the edge server; implementing, at the cloud server and the edge server, a drone data analytics service that reports one or more of drone activity statistics, predicted drone activities, and abnormal behaviors to the cloud consumer device based on statistics and behavior models obtained by machine learning and federated learning techniques; and determining how to configure the drone sensor and collaboratively send signals to deactivate an unauthorized drone in response to initiating a drone mitigation service by the cloud consumer device.

In some embodiments, the cloud server and the cloud device are arranged to form a cloud network; and the edge server and the edge device are arranged to form an edge network.

In some embodiments, the cloud consumer device comprises one or more of the following: a smartphone, a tablet, a virtual reality device, an augmented reality device, a mixed reality device, a laptop, a desktop computer, a sensor node, and/or a drone.

In some embodiments, the cloud server and the edge server each comprise: a data processing unit configured to filter, fuse, and/or aggregate the drone activity data for a drone monitoring service; and an artificial intelligence unit configured to implement the machine learning and/or the federated learning techniques for the drone data analytics service, abnormal behavior detection, and/or collaborative learning.

In some embodiments, the cloud server and the edge server each comprise: a sensor control unit configured to determine parameters for smart sensor configurations and/or intelligent jamming; a mobility support unit configured to handle a drone activity handoff at a boundary of a cloud network or edge network when the drone moves from one network to another; and a traffic management unit configured to handle cooperative interactions with the UAS traffic management system.

In some embodiments, the method further comprises: generating, using the drone data analytics service, an activity notification and a trajectory for one of the identified drones.

In some embodiments, the trajectory and the activity data are overlaid on a map with real-time updates.

Another aspect is a hybrid network for providing drone activity services. The hybrid network comprises a cloud network comprising: a plurality of cloud servers and a plurality of cloud devices; and an edge network comprising: a plurality of edge servers and a plurality of edge devices, wherein the plurality of cloud devices and the plurality of edge devices comprise drone sensors configured to detect and identify drones, wherein the plurality of cloud servers and the plurality of edge servers are configured to aggregate drone activity data from the drone sensors and an uncrewed aircraft systems (UAS) traffic management system, and wherein the plurality of cloud devices and the plurality of edge devices are further configured to monitor drone activities and to access the aggregated drone activity data from the plurality of cloud servers and the plurality of edge servers.

In some embodiments, the plurality of cloud servers and the plurality of edge servers are further configured to implement a drone data analytics service that is configured to report one or more of drone activity statistics, predicted drone activities, and abnormal behaviors to the plurality of cloud devices based on statistics and behavior models obtained by machine learning and federated learning techniques, and wherein a drone mitigation service, when initiated by the plurality of cloud devices, is configured to determine how to configure the drone sensors and collaboratively send signals to deactivate an unauthorized drone.

In some embodiments, the plurality of cloud devices comprises one or more of the following: a smartphone, a tablet, a virtual reality device, an augmented reality device, a mixed reality device, a laptop, a desktop computer, a sensor node, and/or a drone.

In some embodiments, each of the plurality of cloud servers and of the plurality of edge servers comprises: a data processing unit configured to filter, fuse, and/or aggregate the drone activity data for a drone monitoring service; and an artificial intelligence unit configured to implement the machine learning and/or the federated learning techniques for the drone data analytics service, abnormal behavior detection, and/or collaborative learning.

In some embodiments, each of the plurality of cloud servers and of the plurality of edge servers comprises: a sensor control unit configured to determine parameters for smart sensor configurations and/or intelligent jamming; a mobility support unit configured to handle a done activity handoff at a boundary of the cloud network or of the edge network when a drone moves from one network to another; and a traffic management unit configured to handle cooperative interactions with the UAS traffic management system.

In some embodiments, the drone data analytics service is further configured to generate an activity notification and a trajectory for one of the identified drones.

DETAILED DESCRIPTION

Drone monitoring is typically provided by drone detection or counter-UAS (C-UAS) systems. These systems often operate independently and provide limited drone activity information and services. Moreover, even if connected to networks, they are typically not scalable and do not collaborate with other systems in the networks. Therefore, next-generation C-UAS systems are being designed to be part of the modern cloud infrastructure, and have artificial intelligence (AI) capabilities to provide top-notch drone activity services.

Recent advances in edge computing provide a suitable cloud infrastructure for large-scale drone monitoring and mitigation. First, since drone monitoring and mitigation are highly delay-sensitive, edge computing reduces the latency of the cloud service due to the close proximity of edge servers to drone sensors and customers. Second, compared to direct connections between drone sensors and cloud servers, edge computing can support large and dense distributed deployment of drone sensors, and facilitate the collaboration among sensors to achieve better detection and mitigation performance. Moreover, with edge computing, data analytics and machine learning can be more efficient and accurate, which offers more satisfying customized customer experiences.

Aspects of this disclosure relate to primary drone activity services for drone monitoring, drone data analytics, and drone mitigation based on the edge computing paradigm. In traditional drone monitoring systems, edge computing has been used to control authorized drones and manage their activities for performing certain tasks such as delivery and event monitoring. These solutions typically have the full control of those drones.

In contrast to traditional drone monitoring systems, aspects of this disclosure provide cloud services using edge computing to monitor both authorized and unauthorized drone activities, and mitigate unauthorized drone activities without requiring direct control over those drones, authorized or unauthorized. In certain embodiments, the system can implement monitoring and mitigation of drone activities using edge computing based on federated learning techniques for the data analytics of drone activities.

Cloud networks include cloud servers and cloud devices connected via wired (e.g. Ethernet, optical) and/or wireless connections (e.g. Wi-Fi, 4G LTE/5 G NR/6G cellular, satellite). The cloud infrastructure may include one or more edge networks connected to cloud networks. Nodes in the cloud infrastructure can be servers, gateways, mobile devices, sensors, or any device that has processors, storage, memory, and computing capabilities.

Figure 1:
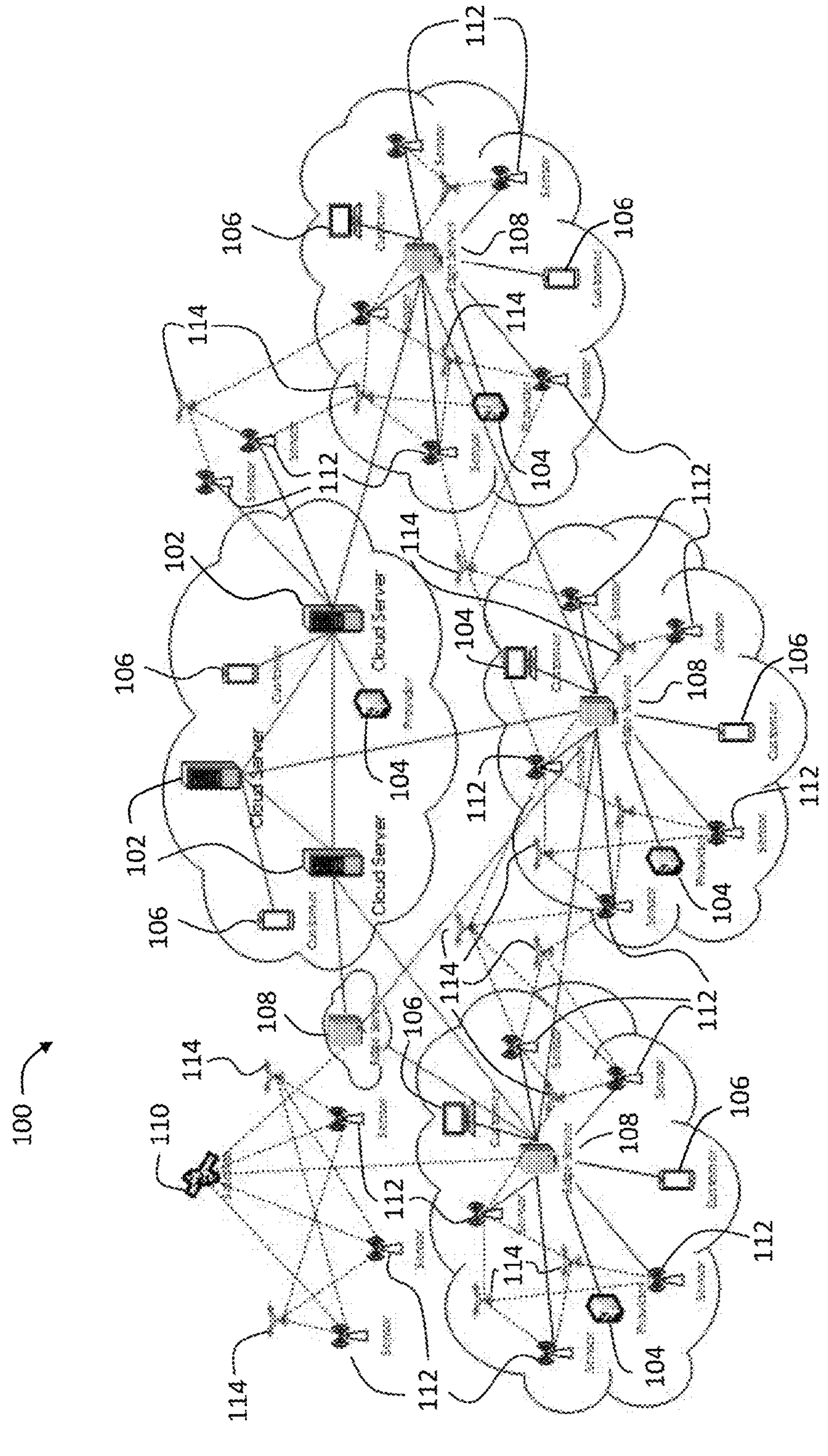
FIG. 1 illustrates the cloud infrastructure with edge computing for drone monitoring, drone data analytics, and drone mitigation.

Cloud servers are typically located at data centers, which can be physically far away from edge networks and cloud consumers. Edge networks, on the other hand, are typically in close proximity to cloud consumers compared to cloud servers. Edge networks can also be densely deployed in the same or different geographical areas. FIG. 1 illustrates an example of a cloud infrastructure 100 with edge computing for drone monitoring, drone data analytics, and drone mitigation. As shown in FIG. 1, the cloud infrastructure can include one or more cloud servers 102, one or more providers 104, one or more customer devices 106, one or more edge servers 108, one or more satellites 110, one or more sensors 112, and/or one or more drones 114.

Figure 2:
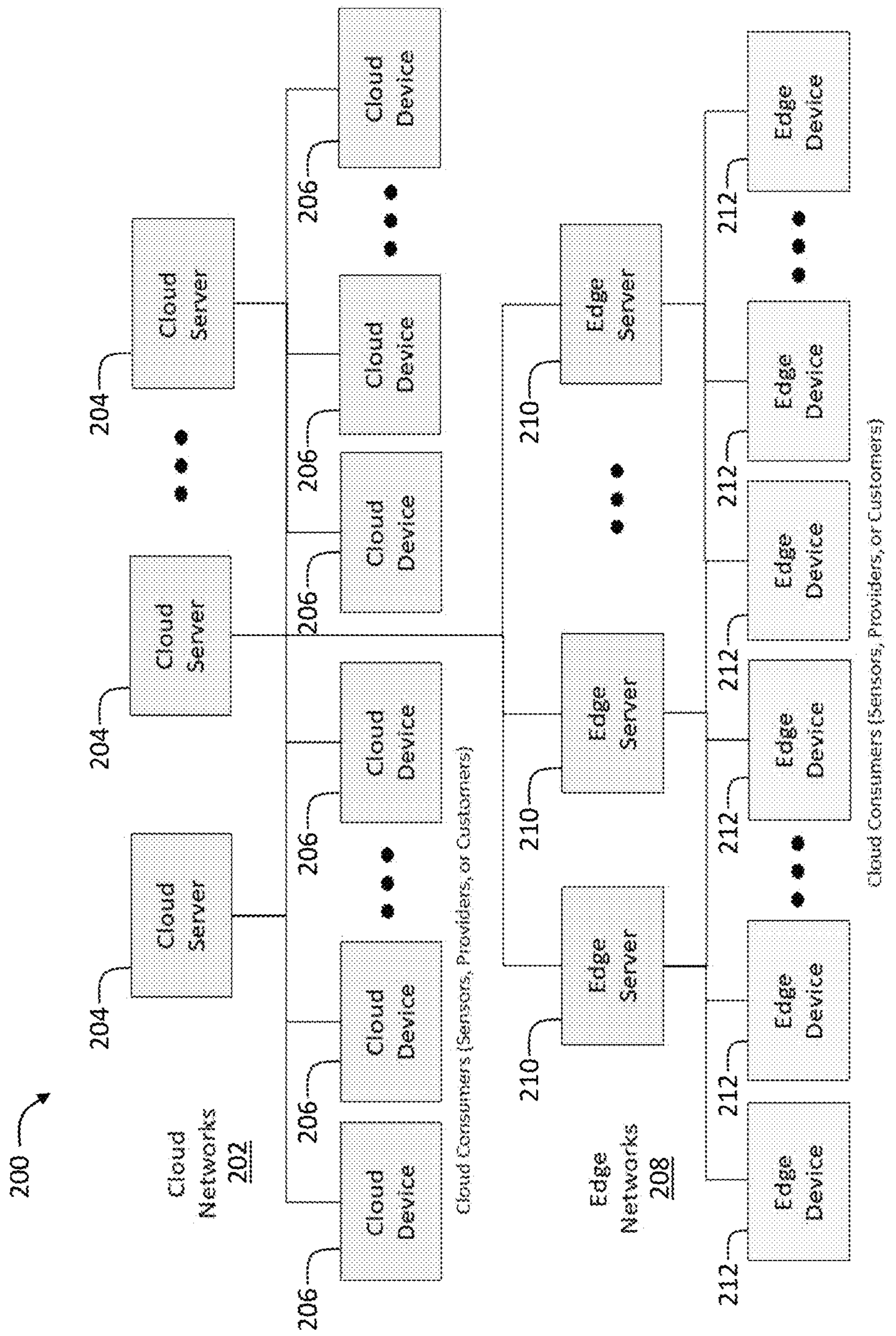
FIG. 2 shows an abstraction model of the cloud infrastructure with edge computing.

FIG. 2 shows an abstraction model 200 of the cloud network infrastructure. As shown in FIG. 2, the model 200 includes one or more cloud networks 202 including one or more cloud servers 204 (e.g., the cloud servers 102 of FIG. 1), and one or more cloud devices 206 (e.g., the providers 104, the consumer devices 106, and/or the sensors 112 of FIG. 1). The model 200 also includes one of more edge networks 208 including one or more edge servers 210 (e.g., the edge servers 108 of FIG. 1) and one or more edge devices 212 (e.g., the sensors 112, the providers 104, and/or the customer devices 106 of FIG. 1).

The one or more cloud devices 206 may include smartphones, tablets, virtual reality (VR)/augmented reality (AR)/mixed reality (MR) devices, laptops, desktop computers, sensor nodes, drones, and other devices. Cloud devices can be either connected to the one or more edge servers 210 in the one or more edge networks 208 to access the cloud, or directly connected to the cloud (e.g., via the one or more cloud servers 204) if no edge server 210 is in close proximity. In the former case, cloud devices in the edge networks 208 are called edge devices 212. Note that cloud devices may access the cloud via a satellite link if no terrestrial network infrastructure is available in the area.

The one or more edge networks 208 is formed by connecting edge devices 212 to edge servers 210/gateways via wired or wireless connections in a geographical area. The edge servers 210 perform edge computing, data processing, and data analytics, store/retrieve data to/from the databases in local storages, and send/receive data to/from the cloud and edge devices 212. In addition to typical network management functions, there can be at least five functional units in cloud and edge servers 210 to support cloud services.

Figure 3:
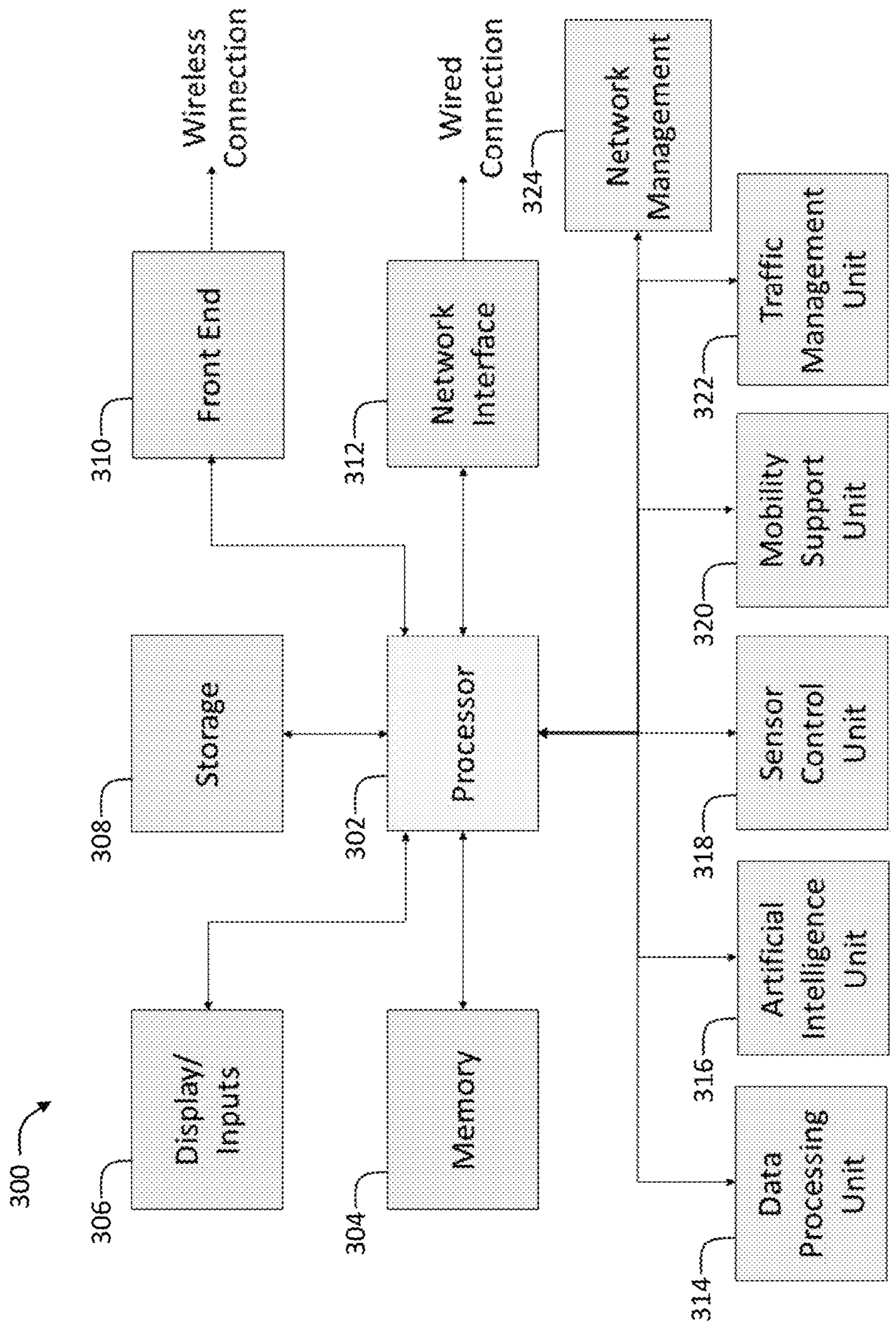
FIG. 3 shows a block diagram of a cloud or edge server for cloud services using edge computing according to aspects of this disclosure.

FIG. 3 shows a block diagram of a cloud or edge server 300 for cloud services using edge computing according to aspects of this disclosure. As shown in FIG. 3, the cloud or edge server 300 can include a processor 302, a memory 304, a display/inputs 306, storage 308, a front end 310, and a network interface 312. As discussed herein, the storage 308 can include a drone target database configured to store processed drone activity data. The drone activity data may be processed based on raw RF samples and/or drone activity data received from sensors (e.g., the sensors 112 of FIG. 1). The front end 310 can be configured to provide wireless connections to cloud devices and/or edge devices (e.g., cloud devices 206 and/or edge devices 212 of FIG. 2). The network interface 312 can be configured to provide wired connections to cloud devices and/or edge devices.

The cloud or edge server 300 can also include:

- A data processing unit 314 configured to handle drone activity data filtering, fusion, and aggregation for drone monitoring service;
- An AI unit 316 configured to handle machine learning, deep learning, and federated learning tasks for data analytics, abnormal detection, and collaborative learning;
- A sensor control unit 318 configured to compute and/or determine parameters for smart sensor configurations and intelligent jamming;
- A mobility support unit 320 configured to handle the done activity handoff at the cloud or edge network boundary when drones move from one network to another; and/or
- A traffic management unit 322 configured to handle the cooperative interactions with the UAS Traffic Management (UTM) system.

The cloud or edge server 300 can also be connected to a network management component 324.

Sensor nodes (or simply referred to as sensors) can be deployed as cloud/edge devices (e.g., cloud devices 206 and/or edge devices 212 of FIG. 2) deployed by C-UAS system providers, or simply smart devices (e.g. smartphones, tablets, or even drones) used by cloud consumers to detect and identify drones and their radio controllers (RCs). The types of sensors for drone detection can be RF, radar, and/or optical. The sensors can send cither raw RF samples or drone activity data to edge servers 300 and cloud servers 300 directly for processing. After processing, data are stored in the drone target database of these servers. The drone activity data generated by sensors may include drone ID (remote ID, persistent ID, serial numbers, or other forms of IDs), telemetry data, drone geolocations, drone pilot/home locations, drone hardware status, etc. An exemplary sensor node is described in U.S. Patent App. Pub. US2021/0407305 A1, Dec. 30, 2021 which forms part of this disclosure.

There are at least two types of cloud consumers in this paradigm: C-UAS system providers (also referred to as providers) and C-UAS system customers (also referred to as customers). Providers can include cloud consumers that deploy multiple sensor nodes and edge gateways/servers 300 in each geographical location for detecting drones and collecting drone activity data. Customers can include cloud consumers that subscribe to drone monitoring and mitigation services. Customers can be provided with access to the drone activity data and visualize the drone activity data on a map as well as initiate drone mitigation through the cloud user interface (e.g. apps or web browsers). Customers' smart devices can also detect drones and report drone activity data. In this case, customers can also act as sensors.

Figure 4:
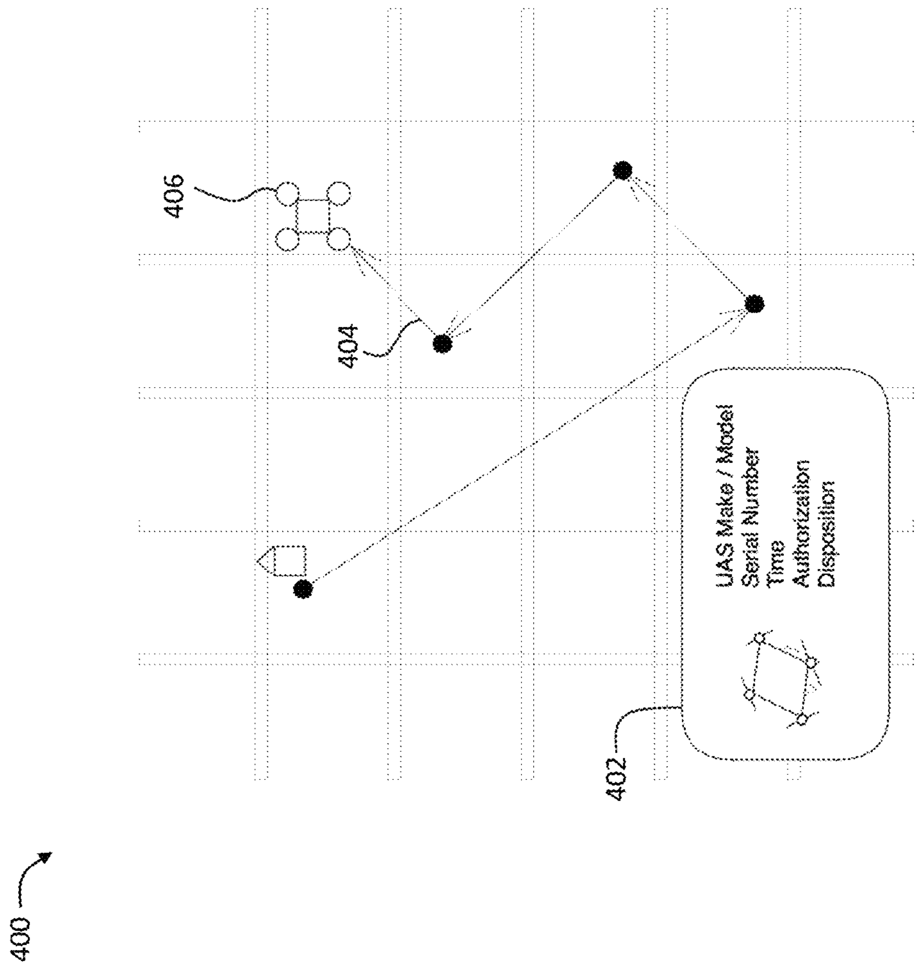
FIG. 4 illustrates a screenshot of a drone activity notification and a drone trajectory from the cloud services on the display of a cloud device.

FIG. 4 illustrates a screenshot 400 of a drone activity notification 402 and a drone trajectory 404 for a drone 406 from the cloud service on the display of a cloud device.

There are at least three primary types of drone activity services: monitoring, data analytics, and mitigation.

Drone Monitoring Service

Drone Detection and Identification

When sensors detect the presence of one or more drones, the sensors can generate drone activity data, and send the raw data and/or generated data to edge and/or cloud servers. The drone activity data can be synchronously or asynchronously sent from sensors to servers. The data received by servers may contain duplicate or redundant information from multiple sensors regarding a particular drone target.

Drone Data Aggregation and Collection

The cloud or edge servers can receive drone activity data from sensors and the UTM, filter redundant information, remove duplicates, combine data, generate data analytics, update statistics and learning models, store selected data locally, and/or send selected data to cloud servers for processing and storage at data centers. Thus, the duplicate and redundant information can be removed such that the redundant information is not presented to customers.

Drone Activity Visualization and Monitoring

The drone activity data stored in the edge or the cloud can be retrieved by cloud consumers (both providers and customers) at any location with connections anytime through the cloud user interface using any cloud or edge device. The provider and consumer software in the servers and devices are capable of retrieving and showing drone activities on a 2D or 3D map (e.g. satellite map, street-view) with real-time updates. Customers can visualize the drone activities in real time such as drone trajectory and drone home points on a map in a selected area. Visualizations present a unified accounting of drone activities due to the data aggregation and collection performed by cloud or edge servers. Customers will also receive notifications and statistics of drone activities in the areas of interest.

Drone Traffic Management

Upon receiving the real-time drone constraints from the UTM, the cloud and servers in the areas can monitor the drone activities and analyze the activity data. The cloud and servers can also report any violation to the UTM, and notify customers (e.g. law enforcement) via the API on cloud and edge devices.

Drone Data Analytics Service

Drone Activity Statistics and Customer Behavior Models

The data analytics can be performed regularly by incorporating new data with previously collected data in order to generate statistics of drone activities and build customer behavior profiles based on their usage of service. These models are established and adaptively updated using data sent from cloud and edge devices (e.g. sensors or customers), and federated learning techniques that facilitate collaborative machine learning.

The drone data statistics may be inquired by providers and customers. Some examples are:

The frequency of drones appearing in a selected area hour by hour over one month, The locations of drone activities in an area over a period of time, and The ranking of the drones that are commonly seen in an area over a period of time.

The customer behavior profiles and models can show customers' preference regarding cloud service usages and drone activity inquiries. The profiles can provide customized information via cloud user interfaces for better customer service, prioritizing global/local data storage at cloud/edge servers to minimize the latency of data retrieval, and so on.

Drone Activity Prediction

The drone activity prediction service can provide customers the prediction of drone activities based on drone data analytics, activity statistics, and customer inquiries. For example, law enforcement may be interested in the possible locations of unauthorized drone activity the next day, or the real-time predicted drone trajectory.

Anomaly Detection

The anomaly detection can be used to detect the abnormal behavior of any drone target. The anomaly detection can generate warnings or alert customers for any concern (e.g. public safety) in real time. The anomaly detection can also detect the abnormal behavior of any server and device connected to the networks. The anomaly detection can notify providers to investigate any system failure or security issue. This service can detect malfunctioning sensors, compromised edge devices, and intruders to ensure system security, data integrity, and customers' privacy.

Drone Mitigation Service

Intelligent Jamming and Smart Sensor Configuration

Customers can make requests via the cloud user interface to mitigate the activity of one or more unauthorized drones in real time. After receiving the requests from customers, the cloud or edge server sends commands to selected sensor nodes based on the mitigation strategy for the targets, configures the transmitters and antennas of these nodes for beamforming and collaborative jamming. The communications between the targets and their pilots are then disrupted. The deactivated unauthorized targets are either forced to land or return to their bases where their pilots are located.

In addition to intelligent jamming, the service can dynamically configure sensors to optimize sensing schedule, reduce power consumption, increase sensing range, and improve detection accuracy making drone detection more effective and efficient.

Drone Activity Mitigation for Authorized Drone Pilots

Customers may have a fleet of drones (authorized drones) for tasks or missions that can be configured, instructed, managed, and/or controlled by customers' authorized drone pilots. The cloud services provide drone activity information and visualization to authorized drone pilots, and assist them in their tasks and missions. For example, the service provides drone activities (both authorized and unauthorized drones) to law enforcement so that their authorized pilots can cooperate with each other, fly their drones in a seamless fashion, pursue unauthorized drones, and find the locations of unlawful pilots. Similarly, the service can assist first responders in their disaster relief missions by providing the authorized drone activities for their pilots to operate their drones collaboratively to survey the disaster areas, coordinate their operations, and monitor the progress.

Implementing Systems and Terminology

Implementations disclosed herein provide systems, methods and apparatus for drone monitoring, data analytics, and mitigation cloud services using edge computing. It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The drone detection, analytics, and mitigation functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A system for providing drone activity cloud services to cloud consumer devices, the system comprising:

a drone sensor configured to detect and identify a drone in a geographic area;

a cloud server configured to be located at a data center outside of the geographic area;

an edge server configured to be located within the geographic area, wherein the cloud server and the edge server are configured to aggregate drone activity data from the drone sensor and an uncrewed aircraft systems (UAS) traffic management system; and a cloud consumer device configured to monitor drone activities using the cloud server, wherein the cloud consumer device is further configured to access the aggregated drone activity data, wherein the cloud server and the edge server are further configured to implement a drone data analytics service, and wherein the cloud server reports one or more of drone activity statistics, predicted drone activities, and abnormal behaviors to the cloud consumer device based on statistics and behavior models obtained by machine learning and federated learning techniques, wherein at least a portion of the statistics and behavior models are stored at the edge server, wherein a drone mitigation service, when initiated by the cloud consumer device, is configured to determine how to configure the drone sensor and collaboratively send signals to deactivate an unauthorized drone, wherein at least a portion of the drone mitigation service is performed at the edge server without communication to the cloud server to reduce a delay associated with deactivating the unauthorized drone.

2. The system of claim 1, further comprising:

a cloud network comprising the cloud server and the cloud consumer device; and an edge network comprising the edge server.

3. The system of claim 1, wherein the cloud consumer device comprises one or more of the following: a smartphone, a tablet, a virtual reality device, an augmented reality device, a mixed reality device, a laptop, a desktop computer, a sensor node, and/or a drone.

4. The system of claim 1, wherein the cloud server and the edge server each comprise:

a data processing unit configured to filter, fuse, and/or aggregate the drone activity data for a drone monitoring service; and an artificial intelligence unit configured to implement the machine learning and/or the federated learning techniques for the drone data analytics service.

5. The system of claim 1, wherein the cloud server and the edge server each comprises:

a sensor control unit configured to determine parameters for smart sensor configurations and/or intelligent jamming;

a mobility support unit configured to handle a drone activity handoff at a boundary of a cloud or edge network when the drone moves from one network to another; and a traffic management unit configured to handle cooperative interactions with the UAS traffic management system.

6. The system of claim 1, wherein the drone data analytics service is further configured to generate an activity notification and a trajectory for the identified drone.

7. The system of claim 6, wherein the trajectory and the activity data are overlaid on a map with real-time updates.

8. A method for providing drone activity cloud services to a cloud consumer device, the method comprising:

detecting and identifying one or more drones located in a geographic area using a drone sensor;

aggregating, at a cloud server and an edge server, drone activity data from the drone sensor and an uncrewed aircraft systems (UAS) traffic management system, the cloud server configured to be located at a data center outside of the geographic area and the edge server configured to be located within the geographic area;

monitoring, at the cloud consumer device, drone activities using the cloud consumer device to access the aggregated drone activity data;

implementing, at the cloud server and the edge server, a drone data analytics service, and wherein the cloud server that reports one or more of drone activity statistics, predicted drone activities, and abnormal behaviors to the cloud consumer device based on statistics and behavior models obtained by machine learning and federated learning techniques, wherein at least a portion of the statistics and behavior models are stored at the edge server; and determining how to configure the drone sensor and collaboratively send signals to deactivate an unauthorized drone in response to initiating a drone mitigation service by the cloud consumer device, wherein at least a portion of the drone mitigation service is performed at the edge server without communication to the cloud server to reduce a delay associated with deactivating the unauthorized drone.

9. The method of claim 8, wherein:

the cloud server and the cloud consumer device are arranged to form a cloud network; and the edge server is arranged to form an edge network.

10. The method of claim 8, wherein the cloud consumer device comprises one or more of the following: a smartphone, a tablet, a virtual reality device, an augmented reality device, a mixed reality device, a laptop, a desktop computer, a sensor node, and/or a drone.

11. The method of claim 8, wherein the cloud server and the edge server each comprise:

a data processing unit configured to filter, fuse, and/or aggregate the drone activity data for a drone monitoring service; and an artificial intelligence unit configured to implement the machine learning and/or the federated learning techniques for the drone data analytics service, abnormal behavior detection, and/or collaborative learning.

12. The method of claim 8, wherein the cloud server and the edge server each comprise:

a sensor control unit configured to determine parameters for smart sensor configurations and/or intelligent jamming;

a mobility support unit configured to handle a drone activity handoff at a boundary of a cloud network or edge network when the drone moves from one network to another; and a traffic management unit configured to handle cooperative interactions with the UAS traffic management system.

13. The method of claim 8, further comprising:

generating, using the drone data analytics service, an activity notification and a trajectory for one of the identified drones.

14. The method of claim 13, wherein the trajectory and the activity data are overlaid on a map with real-time updates.

15. A hybrid network for providing drone activity services, the hybrid network comprising:

a cloud network comprising: a plurality of cloud servers and a plurality of cloud devices; and an edge network comprising: a plurality of edge servers, wherein the edge network comprises at least one drone sensor configured to detect and identify a drone in a geographic area, the cloud servers configured to be located at one or more data centers outside of the geographic area and each of the edge servers configured to be located within the corresponding geographic area, wherein the plurality of cloud servers and the plurality of edge servers are configured to aggregate drone activity data from the drone sensors and an uncrewed aircraft systems (UAS) traffic management system, wherein the plurality of cloud devices and the plurality of edge devices are further configured to monitor drone activities and to access the aggregated drone activity data, and wherein a drone mitigation service, when initiated by a first one of the plurality of cloud devices, is configured to determine how to configure the drone sensors and collaboratively send signals to deactivate an unauthorized drone, wherein at least a portion of the drone mitigation service is performed at the edge server in the geographic area associated with the unauthorized drone without communication to the cloud server to reduce a delay associated with deactivating the unauthorized drone.

16. The hybrid network of claim 15, wherein:

the plurality of cloud servers and the plurality of edge servers are further configured to implement a drone data analytics service, and wherein the plurality of cloud servers are configured to report one or more of drone activity statistics, predicted drone activities, and abnormal behaviors to the plurality of cloud devices based on statistics and behavior models obtained by machine learning and federated learning techniques, wherein at least a portion of the statistics and behavior models are stored at the plurality of edge servers.

17. The hybrid network of claim 15, wherein the plurality of cloud devices comprises one or more of the following: a smartphone, a tablet, a virtual reality device, an augmented reality device, a mixed reality device, a laptop, a desktop computer, a sensor node, and/or a drone.

18. The hybrid network of claim 15, wherein each of the plurality of cloud servers and of the plurality of edge servers comprises:

a data processing unit configured to filter, fuse, and/or aggregate the drone activity data for a drone monitoring service; and an artificial intelligence unit configured to implement the machine learning and/or the federated learning techniques for the drone data analytics service, abnormal behavior detection, and/or collaborative learning.

19. The hybrid network of claim 15, wherein each of the plurality of cloud servers and of the plurality of edge servers comprises:

a sensor control unit configured to determine parameters for smart sensor configurations and/or intelligent jamming;

a mobility support unit configured to handle a drone activity handoff at a boundary of the cloud network or of the edge network when a drone moves from one network to another; and a traffic management unit configured to handle cooperative interactions with the UAS traffic management system.

20. The hybrid network of claim 15, wherein the drone data analytics service is further configured to generate an activity notification and a trajectory for one of the identified drones.

* * * * *